United States Patent [19]

Davies

[11] Patent Number: 5,223,119
[45] Date of Patent: Jun. 29, 1993

[54] GAS TREATMENT METHOD FOR REMOVAL OF LIQUID DROPLETS

[76] Inventor: David Davies, 547 Avenida Buenos Aires, San Clemente, Calif. 92672

[21] Appl. No.: 843,141

[22] Filed: Feb. 28, 1992

[51] Int. Cl.$^5$ .................. C25D 21/04; B01D 19/00
[52] U.S. Cl. ...................... 205/94; 204/278; 204/DIG. 13; 55/255; 55/256
[58] Field of Search ............ 204/278, DIG. 13; 55/255, 256, 259; 205/94

[56] References Cited

U.S. PATENT DOCUMENTS

| | | | |
|---|---|---|---|
| 3,683,594 | 8/1972 | Schouw | 55/259 X |
| 4,443,233 | 4/1984 | Moran | 55/259 X |
| 4,592,819 | 6/1986 | Suzuki et al. | 204/DIG. 13 X |
| 4,897,247 | 1/1990 | Anderson | 204/DIG. 13 X |
| 5,004,486 | 4/1991 | Chen | 55/255 X |
| 5,078,759 | 1/1992 | Kira | 55/255 X |
| 5,104,496 | 4/1992 | Dupree | 204/278 X |
| 5,112,465 | 5/1992 | Danielson | 204/278 |
| 5,129,926 | 7/1992 | Harwell | 55/255 |

*Primary Examiner*—Donald R. Valentine
*Attorney, Agent, or Firm*—Plante, Strauss & Vanderburgh

[57] ABSTRACT

There is disclosed a gas treatment method and apparatus for the treatment of exhaust gas from an electrochemical plating operation, particularly from a chromium plating operation, to remove therefrom essentially all liquid entrainment. The invention comprises containment of the vapor space over the electroplating baths and evacuating the contained vapor space, passing the gases from the vapor space through a water bath and discharging the gases from the water bath through a mist separator and a sub-micron porous filter. Preferably the mist separator and porous filter are separated by a vapor space to permit coalesced droplets to condense and separate from the gases before passing the gases through the porous filter.

6 Claims, 1 Drawing Sheet

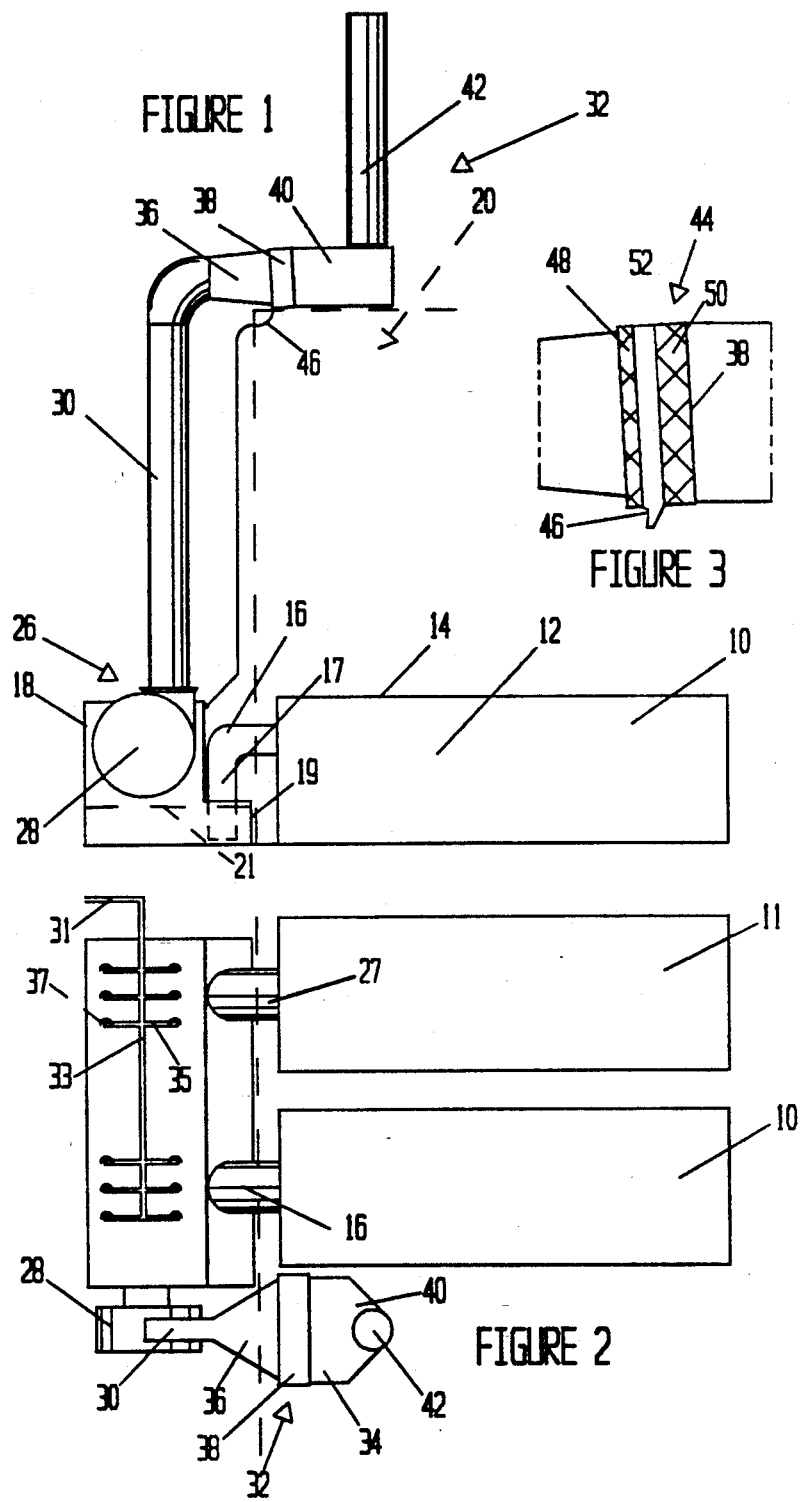

GAS TREATMENT METHOD FOR REMOVAL OF LIQUID DROPLETS

BACKGROUND OF THE INVENTION

1. Field of Invention

This invention relates to a method for the treatment of exhaust gas streams, and, in particular, to a treatment of exhaust gas from a chromium plating plant for the removal of liquid droplets containing chromium salts from the exhaust gas.

2. Brief Statement of the Prior Art

Electroplating operations are extensively used in various industrial applications for imparting a polished surface and/or surface hardness to metal objects. One commercial application of this process is the electroplating of chromium on crankshafts such as the large crankshafts used in large diesel engines for locomotives.

Electroplating vessels used in chrome plating of locomotive crankshafts typically have dimensions from about 14 to 18 feet in length and approximately 3 feet in width and, thus provide a relatively large vapor liquid surface for the entrainment of liquid droplets of the electroplating solution. The environmental problems of such operations is heightened by potential toxicity of salts which are carried into the exhaust gas from such operations. In this regard, hexavalent chromium is recognized as having a relatively high toxicity and, accordingly, diligent efforts must be maintained to limit or curtail the discharge of any hexavalent chromium into the atmosphere with the gases discharged from such electroplating operations.

Various techniques have been used for the removal of liquid droplets from gas streams. Equipment which has been used with limited success includes wet cyclone separators, bag houses, filters, etc. One of the challenges to any such operation is the extremely high efficiency which is required of any filtration system when applied to the aforementioned electroplating operations. Regulations applicable to such operations conducted in metropolitan areas require the removal of at least 99.8% of the entrainment carryover from the exhaust gas. In other words, the removal efficiency must be at least 99.8% or greater to permit the application of the gas treatment method and continuation of the electroplating process.

OBJECTS OF THE INVENTION

It is an object of this invention to provide a gas treatment that will remove at least 99.8% of liquid droplets contained in the gas stream.

It is also an object of this invention to provide such gas treatment for the treatment of exhaust gas from an electroplating process, particularly a chromium plating process.

It is a further object of this invention to provide a gas treatment method that will essentially remove all potentially toxic materials from an exhaust gas stream prior to discharging the exhaust gas to the atmosphere.

Other and related objects will be apparent from the following description of the invention.

SUMMARY OF THE INVENTION

This invention comprises a gas treatment method and apparatus for the treatment of exhaust gas from an electrochemical plating operation, particularly from a chromium plating operation, to remove therefrom essentially all liquid entrainment. The invention comprises containment of the vapor space over the electroplating baths and evacuating the contained vapor space, passing the gases from the vapor space through a water bath and discharging the gases from the water bath through a mist separator and a sub-micron porous filter. Preferably the mist separator and porous filter are separated by a vapor space to permit coalesced droplets to condense and separate from the gases before passing the gases through the porous filter. The aforedescribed method achieves essentially complete removal of entrained liquid droplets. The mist separator preferably comprises a stainless steel screen or filter and the coalesced liquid from the separator and from the subsequent vapor space is passed to the water bath through which the gases are initially passed after removal from the electroplating bath.

BRIEF DESCRIPTION OF THE DRAWINGS

The invention will be described with reference to the FIGURES of which:

FIG. 1 is an elevational view of the facilities as applied to an electrochemical plating operation;

FIG. 2 is a plan view of the installation; and

FIG. 3 is an enlarged sectional view of the final mist separator and filter used in the invention.

DESCRIPTION OF THE PREFERRED EMBODIMENTS

Referring to FIG. 1, there is illustrated a typical large electroplating vessel 10 which is suitable for electroplating of objects such as the crankshafts of locomotive diesel engines. The vessel 10 has a length of from about 15 to 20 feet, usually about 18 feet and a width of approximately 4 feet; see FIG. 2, and has a liquid depth of about 3 feet. The vapor space 12 over the plating solution is contained with a partial cover 14 over the ends of the electroplating vessel which are not occupied by the crankshaft in the electroplating bath, and the vapor space is vented through a duct 16 to a water bath vessel 18.

Each of the ducts such as 16 has a 90 degree downward bend and has a vertical leg 17 which extends beneath the liquid level 21 within the vessel 18.

In the illustration, the electroplating vessel 10 is located within a commercial building 20, the outside walls 22 and roof 24 of which are shown in phantom lines.

The gas treatment facilities of the invention comprise a large tank 18 which contains the water bath, and into which the vapor spaces contained above the electroplating vessels are vented through suitable ducts 16. As shown in FIG. 2, a single gas treatment facility 26 is provided for two electroplating tanks 10 and 11. The ducts 16 and 27 from the electroplating baths 10 and 11 discharge beneath the level of the water contained within the water tank 18 and the gases bubble through the water bath within tank 18, and are evacuated by an exhaust gas blower 28 that is mounted at one end of the water bath tank 18.

As shown in FIG. 2, a water spray header 33 is provided on the top of water tank 18, and is supplied with water through conduit 31. A plurality of branch conduits 35 are provided to supply water to each of a plurality of sprayers 37, which are located at opposite ends of the tank 18, adjacent the inlet ducts 16 and 27.

The exhaust gas blower 28 discharges the wet exhaust gas removed from the water tank 18 through a vertical stack 30 that discharges into the final gas treatment facility 32. This facility is located in a housing 34 that is mounted on the roof 24 of the building 20, and this housing 34 has a tapered entrance chamber 36 that discharges into a filter compartment 38. Gases passing through the filter compartment 38 pass into a collecting compartment 40, from where they are discharged into the short vertical exhaust stack 42 mounted on the upper surface of the housing 34.

The filters 44 which are housed in the filter compartment are shown in greater detail in FIG. 3. The filter compartment 38 is mounted on a slight angle to the horizontal roof 24, so that any liquid coalesced in the filter compartment 38 will drain toward the entrance of the filter compartment 38. A drain 46 is provided in the bottom of the filter compartment 38 and this drain discharges to the water bath in tank 18. The filters which are used include mist separators 48. The mist separators 48 are screens of very tightly spaced stainless steel wires creating a tortuous path to entrap the liquid droplets. The filter compartment 38 has a small air chamber 52 between the mist separators 48 and the final micro filters 50. This air chamber 52 permits coalesced liquid to separate from the gases and collect at the bottom of the air chamber 52. As shown in FIG. 1, the drain from the filter compartment 38 and vapor space chamber 52 is returned to the water tank 18.

The final gas treatment comprises sub-micron filters 50. These filters are commercially available filters that are marketed as Hospital Grade Filters, Model No. OOJ-8-07-IU-11-00-GG-F, Hepafilter by Flanders Filters, Inc., P.0. box 1708, Washington, N.C. 27889, and Demisters Model S6S4 M/S by the Farr Company, P. 0. Box 92187, Los Angeles, Calif., 90009.

Each micro filter is provided with sub-micron fiberglass media. These filters have a standard efficiency rating of 99.97% for the removal of sub-micron, thermally generated particles from gas streams. The filter media is a high density, microfine glass fibers which are formed into a lofted filter blanket and laminated to a reinforced backing.

In prolonged testing, it has been found that the aforedescribed facilities are effective for the removal of greater than 99.8% of liquid droplet carryover from a chromium plating operation. The following specific example will provide details of a suitable construction and demonstrate the removal efficiency of the system.

EXAMPLE 1

The facilities are applied to electroplating baths used for electroplating of locomotive diesel crankshafts. Two tanks are connected to a single gas treatment facility. Each tank has a length of 18 feet, width of 3 feet and contains 38 inches of electroplating solution. The vapor space over each tank is partially contained and evacuated into a single water bath.

The electroplating conditions included a bath temperature of 130° F. and from 3200 to 4200 amps at a DC voltage of from 5 to 6 volts.

The combined gas exhaust gas is removed from the electroplating operation at a volumetric flow rate of 12,000 cubic feet per minute and is discharged to the gas treatment facilities. The filter housing has a length of 12 feet, 8 inches and a width of 8 feet, 11 inches. The filters are contained within a filtration chamber having a thickness of 27 inches and spanning the entire width of the filtration housing. The de-mister filter compartment has a depth of 2 inches and contained 8 stainless screens of 14 mesh. A vapor space 13 inches in length separates the demister compartment from a hepafilter compartment which is 12 inches in length. The filters used in the hepafilter compartment are commercially available sub-micron filters of the aforementioned fiberglass construction.

It is found that continued operations of the electroplating baths at the aforementioned conditions and passage of the gases exhausted from such operations through the aforedescribed gas treatment facilities achieved removal in excess of 99.8% of the droplets contained in the vapor space from the electroplating operations.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an electroplating process wherein a electroplating chemical solution is contained in an open topped electroplating vessel for contact with mechanical items contained therein, the improved method of eliminating discharge of liquid droplets of the electroplating solution to the atmosphere, which comprises;
   a. partially containing the gases over the electroplating bath;
   b. exhausting the gases within the partially contained vapor space over the electroplating bath into a water scrubbing bath and passing said gases through said water bath under turbulent conditions for intimate contacting therein and removing therefrom water-scrubbed exhaust gases;
   c. passing the water-scrubbed gases exhaust gases removed from the water scrubbing bath to a filtration station;
   d. passing said water-scrubbed exhaust gases through a mist separator comprising a plurality of screens having mesh sizes of about 14 mesh to obtain demisted exhaust gases;
   e. passing the demisted exhaust gases from the mist separator through a sub-micron filter to remove any entrained mist therefrom and to obtain filtered exhaust gases and discharging said filtered exhaust gases to the atmosphere.

2. The method of claim 1 including the steps of collecting coalesced and condensed liquid from said mist separator and recycling the collected liquid to the water scrubbing bath.

3. The method of claim 1 wherein said electroplating operations is conducted at a temperature from about 90 to about 175° F.

4. The method of claim 1 wherein said evacuating of the exhaust stream is performed by including a blower in the exhaust gas stream, between said water scrubbing step and said filtration station.

5. The combination of gas treatment facilities including a water scrubbing vessel comprising a water scrubbing tank with means to introduce an exhaust gas beneath the liquid level of water contained therein;

an exhaust gas blower with its intake connected to the contained vapor space over said water scrubbing tank and its discharge communicating with a conduit leading to a filtration housing;

a filtration housing including a filter compartment having a mist separator compartment, a vapor space compartment and a sub-micron filter compartment in tandem series communication; and an exhaust gas stack to receive exhaust gas from said filtration housing and exhaust said gas to the atmosphere.

6. The apparatus of claim 5 including a condensed and coalesced liquid collection chamber in the bottom of said vapor space compartment and including a conduit to return the condensed and coalesced liquid to the water scrubbing tank.

* * * * *